(12) United States Patent
Huang et al.

(10) Patent No.: US 9,439,147 B2
(45) Date of Patent: Sep. 6, 2016

(54) MECHANISMS OF REDUCING POWER CONSUMPTION FOR NAN DEVICES

(71) Applicant: Intel IP Corporation, Santa Clara, CA (US)

(72) Inventors: Po-Kai Huang, West Lafayette, IN (US); Emily H. Qi, Portland, OR (US); Minyoung Park, Portland, OR (US); Robert J. Stacey, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 39 days.

(21) Appl. No.: 14/320,012

(22) Filed: Jun. 30, 2014

(65) Prior Publication Data

US 2015/0382301 A1 Dec. 31, 2015

(51) Int. Cl.
*G08C 17/00* (2006.01)
*H04W 52/02* (2009.01)
*H04W 8/00* (2009.01)
*H04W 84/12* (2009.01)

(52) U.S. Cl.
CPC ............ *H04W 52/0229* (2013.01); *H04W 8/00* (2013.01); *H04W 8/005* (2013.01); *H04W 52/02* (2013.01); *H04W 84/12* (2013.01)

(58) Field of Classification Search
CPC ........... H04W 52/02; H04W 52/0216; H04W 84/12; H04W 52/0229; H04W 84/18
See application file for complete search history.

(56) References Cited

U.S. PATENT DOCUMENTS

| 8,725,220 | B2 * | 5/2014 | Chueh | ................. | H04W 36/24 370/311 |
|---|---|---|---|---|---|
| 2005/0117530 | A1* | 6/2005 | Abraham | .......... | H04W 52/0232 370/310 |
| 2010/0110930 | A1* | 5/2010 | Kohvakka | ......... | H04W 56/0025 370/254 |
| 2011/0142014 | A1* | 6/2011 | Banerjee | ............. | H04L 63/0869 370/338 |
| 2014/0056220 | A1* | 2/2014 | Poitau | ................. | H04W 40/246 370/328 |
| 2014/0254426 | A1* | 9/2014 | Abraham | .............. | H04W 48/10 370/254 |
| 2014/0302787 | A1* | 10/2014 | Rantala | ................. | H04W 4/008 455/41.2 |
| 2014/0313966 | A1* | 10/2014 | Shukla | .................. | H04W 48/10 370/312 |
| 2014/0321317 | A1* | 10/2014 | Kasslin | ................... | H04W 4/08 370/254 |
| 2014/0321452 | A1* | 10/2014 | Choi | ..................... | H04W 8/005 370/350 |
| 2015/0006633 | A1* | 1/2015 | Vandwalle | .......... | H04L 67/1051 709/204 |
| 2015/0009875 | A1* | 1/2015 | Khoryaev | ............. | H04W 48/16 370/311 |
| 2015/0131529 | A1* | 5/2015 | Zhou | ..................... | H04W 84/18 370/328 |

* cited by examiner

*Primary Examiner* — Mark Rinehart
*Assistant Examiner* — Sanjay K Dewan
(74) *Attorney, Agent, or Firm* — Schwegman Lundberg & Woessner, P.A.

(57) ABSTRACT

A wireless communication device comprises a transceiver configured to communicate information with one or more neighbor devices in accordance with a sync mode of a WiFi communication protocol, and a controller. The controller is configured to monitor for reception of at least one of a response frame or a beacon frame sent by any neighbor device, determine whether to schedule transmission of a service frame, and change operation to a background scan mode when the at least one of the response frame or the beacon frame sent by any neighbor device is undetected for a specified time duration and the transmission of a service frame is unscheduled.

25 Claims, 3 Drawing Sheets

US 9,439,147 B2

MECHANISMS OF REDUCING POWER CONSUMPTION FOR NAN DEVICES

TECHNICAL FIELD

Embodiments pertain to wireless communication networks. Some embodiments relate to local area networks that communicate according to a neighbor awareness networking (NAN) protocol.

BACKGROUND

Electronic devices are often interconnected by wireless means to form a network, such as a computer network for example. The devices of the wireless network communicate information using radio frequency (RF) signals, such as by spread spectrum or frequency multiplexing techniques. A wireless local area network (WLAN) is one type of network and a WiFi network is a WLAN implemented under the Institute of Electrical and Electronic Engineers 802.11 standard (IEEE 802.11), such as the IEEE 802.11-2012 standard published Mar. 29, 2012. Network protocols continue to evolve to enable more types of devices communicate. A challenge is to reduce the amount of power required by a device and still provide the communication functionality of the protocol. Thus, there are general needs for devices, systems and methods that provide a protocol for electronic devices to communicate yet result in energy efficient operation of the devices.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

WLANs are a popular means to facilitate communication among electronic devices. In some forms of WLANs, the network can be self-discoverable by the individual electronic devices. This provides ease of network setup and allows electronic devices to enter and leave the network. This is useful for portable electronic devices such as cellular telephones, smart phones, and portable computers such as a laptop or tablet computers to easily enter and leave the network. It is desired that the communication protocol not consume a major portion of the energy used to power an electronic device.

Figure 1:
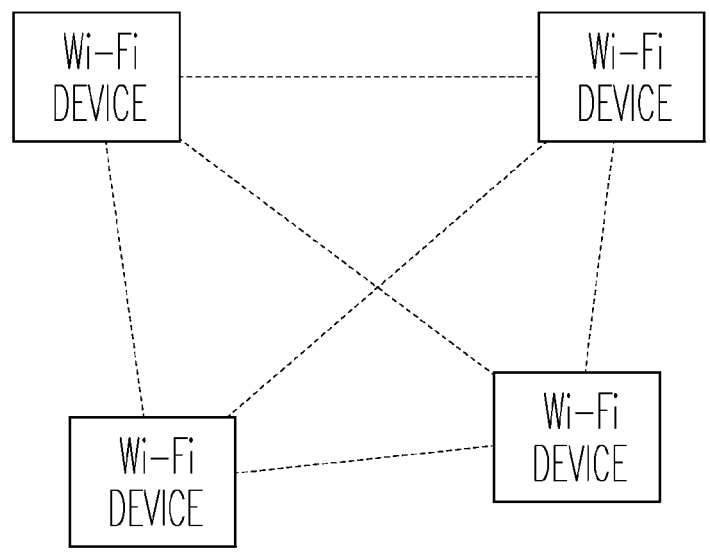
FIG. 1 illustrates a representation of a cluster of WiFi devices in accordance with some embodiments.

The Neighbor Awareness Networking (NAN) protocol is a protocol that provides a method for device-to-device service discovery among WiFi capable devices. Under the NAN protocol, WiFi devices in an area may form a cluster. FIG. 1 illustrates a representation of a cluster of WiFi devices. A WiFi-capable device that includes a printer may publish or advertise to other devices in the network that the printing service is available. Another device in the network may receive the notification of the service and begin communicating information with the printing device to take advantage of that service.

Figure 2:
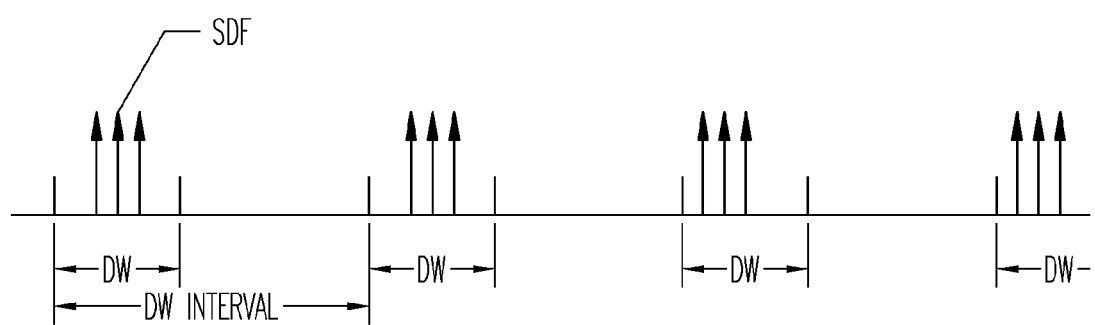
FIG. 2 illustrates a simplified example of device communication in accordance with some embodiments.

FIG. 2 illustrates a simplified example of device communication 200 according to the NAN protocol. Forming a cluster involves the WiFi devices synchronizing communications to each other. As part of the synchronization, the devices in the network discover each other by listening or transmitting during a discovery window (DW). Once a cluster is formed, the DWs occur according to a schedule. To notify or learn of an available service, the devices listen for or transmit a service discovery frame (SDF) during a DW. To reduce energy consumption, the devices may enable the transceivers in anticipation of scheduled DWs and disable their transceivers after the scheduled DWs have ended. This can be referred to as a sleep mode. Other than timing to track when the DWs occur, circuitry used to implement the communication protocol can be disabled or powered down to conserve energy.

However, the overall power consumption of a device in a NAN protocol can still be larger than desired. The current draw of a WiFi device with a receiver in idle mode may be more than an order of magnitude higher than when the receiver is powered down. Transmitting packets of information causes even more current draw. A WiFi device synchronized to a cluster typically needs to power up its receiver for two DWs each second. Hence, there are opportunities to further reduce the power drain of a NAN device.

Figure 3:
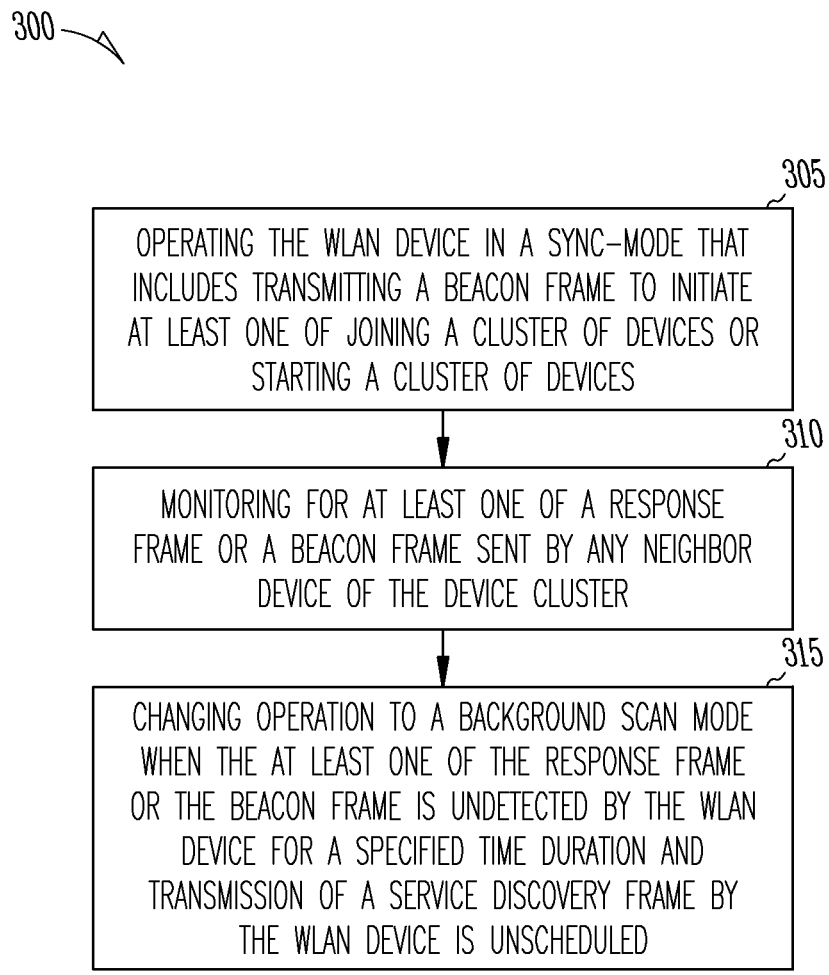
FIG. 3 shows a block diagram of an example of a method of operating a WLAN device in accordance with some embodiments.

FIG. 3 shows a block diagram of an example of a method 300 of operating a WLAN device to reduce power consumption. At 305, the WLAN device is operated in a sync-mode. The sync-mode includes transmitting a beacon frame to initiate the WLAN device joining a cluster of devices or to initiate the WLAN starting a cluster. Although, use of the term "cluster" implies a NAN network, the method can be applied to a WLAN device communicating according to a different protocol.

At 310, the device monitors for one or both of a response frame or a beacon frame sent by any neighbor device of the device cluster. This alerts the device to the existence of another device in the cluster or in the area.

At 315, the WLAN device changes operation to a background scan mode when the response frame or the beacon frame is undetected by the WLAN device for a specified time duration (e.g. a specified timeout), and the WLAN device does not have a scheduled transmission of a service discovery frame.

Figure 4:
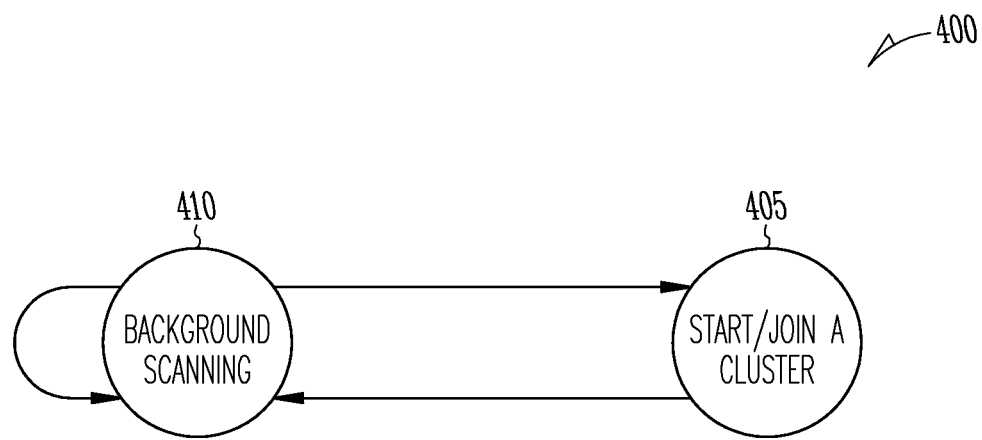
FIG. 4 shows an example of a state diagram for a WLAN device in accordance with some embodiments.

FIG. 4 shows an example of a state diagram 400 of the example method shown in FIG. 3. In state 405, if the WLAN device finds that it is the only device in the cluster, does not want to start a cluster, and the WLAN device does not wish to advertise any services, then it transitions to background scanning in state 410. When background scanning, the WLAN device may enable its transceiver less than every DW. For instance, the WLAN device may power up its transceiver for one in five DWs or DW intervals, or one in ten. According to a conventional NAN protocol, when a device is the only device in the network area it must transit a synchronization beacon in every DW; even when it does not wish to advertise services. Thus, transitioning to the background scan mode under this condition can greatly reduce the power consumption by a WLAN device. When operating in the background scan mode in state 410, the WLAN device may remain in the background scan mode (and not join a cluster or a start a cluster) while the WLAN device does not detect other devices and continues to not want to advertise any services. When the WLAN device needs to discover other devices or advertise a service, the WAN device transitions back to normal scanning mode at state 405.

Figure 5:
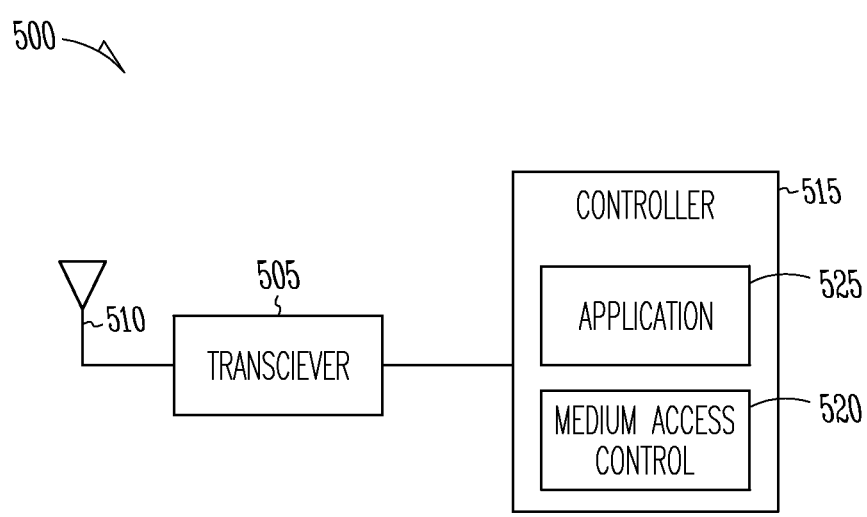
FIG. 5 shows a block diagram of portions of an example of a wireless communication device in accordance with some embodiments.

FIG. 5 shows a block diagram of portions of an example of a wireless communication device 500. The device may be a portable electronic device such as cellular telephones, smart phones, portable computers such as a laptop or tablet computers, or the device may be a WiFi communication station.

The wireless communication device includes a transceiver 505 configured to communicate information with one or more neighbor devices in accordance with a synchronization mode or sync mode of a WiFi communication protocol. The transceiver 505 may be part of a physical layer or PHY layer of the communication device 500. The transceiver 505 can be electrically coupled to one or more antennas 510.

The device also includes a controller 515. The controller 515 can include modules and sub-modules to perform the functions described. A module can include hardware, firmware, or software or combinations of hardware, firmware, and software. The controller 515 can include a processor such as a microprocessor or other type of processor to perform software or firmware instructions. The controller 515 can be configured by one or more of hardware, firmware, and software to perform the functions described. The controller can include a medium access control layer 520 or MAC layer for controlling access to the transceiver 505, and for formatting information for transmission and extracting received information.

The controller 515 monitors for reception of at least one of a response frame or a beacon frame sent by any neighbor device. The response frame or beacon frame can indicate the presence of a cluster or the presence of one or more devices available for forming a cluster. The controller 515 also determines whether to schedule transmission of a service frame, such as to advertise service for example. If a response frame or the beacon frame sent by any neighbor device is undetected by the controller 515 for a specified time duration and transmission of a service frame is unscheduled (e.g., because an Application 525 does not indicate a service should be advertised or published) the controller 515 changes operation to a background scan mode. As explained previously, the background mode can reduce the power consumption of the device by reducing the amount of time that transceiver needs to be powered up.

There are additional approaches to reducing the power required to run the transceiver. According to some examples, the transceiver 505 communicates information in accordance with a NAN protocol. For instance, the MAC layer 520 of the controller 515 may include a NAN MAC layer to implement the protocol, and the controller 515 may initiate joining a cluster of NAN devices according to the NAN protocol. To reduce power consumption, the controller 515 may change operation of the device to a non-sync mode of the NAN protocol when it is participating in the cluster. If a NAN device is operating in the NAN sync mode, the device needs to transmit a synchronization beacon in every scheduled DW and thus power up its transceiver every DW.

To reduce power consumption, the controller 515 can transition the communication by the device to a non-sync mode. In the non-sync mode, the device does not need to provide the beacon every DW and can enter a sleep mode during the time duration of one or more scheduled discovery windows of the cluster. The controller 515 may change operation to the non-sync mode when if the device does not need to discover other devices.

Multiple approaches can be used to wake up the device from the sleep mode and participate in inter-device communication. Once the device has joined a cluster, the time schedule for DWs is known by the controller 515 and a timer (separate from or integral to the controller 515) can be used to determine when the DW occurs. Power consumption of the device can be reduced by not waking up for every DW. According to some examples, the controller 515 may randomly, or pseudo-randomly, select a DW for wake up. For instance, when in the sleep mode, the controller 515 may select a scheduled discovery window according to a random selection algorithm and enable the transceiver during the selected scheduled discovery window. If a scheduled DW has a probability p of being selected by the random selection algorithm for wake up, then the power consumption by the device is reduced by a factor of 1/p. The advantage of a random approach is that a NAN device operating in a non-sync mode can easily determine whether to wake up for the next scheduled DW. The random selection approach may increase latency in the self-discovery by devices. The probability of two NAN devices both operating in a non-sync mode with a random wake up during the same DW is $p^2$, which may be a small probability.

The selection of DWs for wake up can more deterministic than the random approach. When a NAN cluster is formed, all the NAN devices of the cluster are to be awake and not in the sleep mode for a DW designated as DW0. DW0 is defined as the DW in which the lowest 23 bits of the time synchronization function (TSF) timer are zero (0). Let DWi designate the ith DW between any two consecutive DW0s, i being a positive integer. A deterministic algorithm can be used to designate which of the i DWs during which all NAN devices will be awake. In some examples, when in the sleep mode the controller 515 may select a plurality of scheduled discovery windows and enable the transceiver 505 during the plurality of scheduled discovery windows. For example, the NAN devices may be configured to all be awake from the sleep mode (or operating in the sync mode without a sleep mode) for a DW when i % c=0, where % is the modulus operator and c is a constant. Thus, if c=2, then every NAN device in a non-sync mode wakes up in even DW time slots, and the power consumption of non-sync mode devices is reduced by a factor of c.

The values of the constants p and c may be specified beforehand and have a fixed value for the NAN devices, (e.g., p=0.5 and c=2). In certain examples, the values of p and c can be distributed to the devices of the cluster. For instance, a designated anchor master device may determine the value of one or both of p and c and devices operating in sync mode may distribute the value or values in a synchronization beacon.

The power drain of the transceiver is greater when transmitting than when powered up and merely idle. The power consumption may be further reduced by reducing the transmission of information during a DW when a NAN device is awake. In some examples, the period of transmitting an SDF by a NAN device to advertise a service is different from a period used by another NAN device to scan for the services. The controller of the adverting device may, when in the sleep mode, select a plurality of scheduled DWs and enable the transceiver during the plurality of scheduled DWs. The controller 515 may initiate the transmission of an SDF in n of the DWs in which the transceiver is enabled. Thus, the advertising NAN device may transmit a number of service discovery frames that is different from a number of synchronization beacon frames transmitted during the selected plurality of scheduled discovery windows.

The scanning NAN device that is looking for an SDF may have a scanning interval of m DWs and a scanning window of w DWs. Stated another way, the scanning NAN device stays awake for w consecutive DWs every m DWs, where m is a positive integer greater than the positive integer w. The values of n, m, and w may be specified beforehand and have a fixed value, or the designated anchor master device may determine the values and devices operating in the sync mode may distribute the values in a synchronization beacon. In certain examples, the values of n, m, and w may be determined by the applications of the advertising and scanning NAN devices. A NAN device may terminate its performance of any of these approaches if it is desired to minimize discovery latency, such as by changing mode to wake for every scheduled DW for example.

Another approach to reduce the power drain of the wireless communication device 500 is to reduce the amount of time that the transceiver is powered up during the DW. For instance, if the time duration of a DW is 16 milliseconds (16 ms), the power drain due to the transceiver can be reduced by powering the transceiver for less than the full 16 ms time duration.

According to some examples, if the controller 515 determines that a service is not required from a separate communication device of the NAN cluster, the controller 515 can transition to the sleep mode during the scheduled DW before receiving an SDF (because it is not needed) and before expiration of the DW. The controller 515 may initiate this change to the sleep mode when operating in either the sync mode or the non-sync mode. If the controller 515 determines that a service of a separate communication device of the cluster is required, the controller 515 may change to the sleep during the scheduled DW after a receiving service discovery frame and before expiration of the DW. Thus, the NAN device can enter the sleep mode during the DW when all the packets required by the device are received, whether it is operating in the sync mode or in the non-sync mode.

Some examples follow to illustrate the approach and are intended to be non-limiting. According to a conventional NAN protocol, a synchronization beacon is transmitted during a DW at a time of Hop_count*40*aSlotTime from the start of the DW, where Hop_count≤Max_Hop_count_threshold. The maximum back off window for a synchronization beacon is 31. According to a conventional NAN protocol, an SDF is injected at the start of a DW and the maximum backoff for an SDF is 511.

If a NAN device does not need to discover other devise in the cluster (e.g., based on the Application 525 of the device), it does not need to wait to receive an SDF transmitted by the other devices. When the controller 515 of the device detects (e.g., by timeout) that the medium is idle for Max_Hop_count_threshold*40*aSlotTime+31*aSlotTime, the controller can initiate sleep mode. Assume that Max_Hop_count_threshold is 5 and aSlotTime is 9 microseconds (9 μs), then the controller 515 can initiate sleep mode when it detects that the medium is idle for 2.1 ms after the start of a DW.

For the case where a NAN device does need to discover other NAN devices, a synchronization beacon must be transmitted after Max_Hop_count_threshold*40*aSlotTime+31*aSlotTime, and an SDF must be transmitted after 511*aSlotTime. Thus, if the NAN device senses that the medium is idle for the maximum of these values or max (Max_Hop_count_threshold*40*aSlotTime+31*aSlotTime, 511*aSlotTime), then the controller 515 can initiate sleep mode. Assume that Max_Hop_count_threshold is 5 and aSlotTime is 9 microseconds (9 μs), then the controller 515 can initiate sleep mode when it detects that the medium is idle for 4.6 ms after the start of a DW. A value of maximum clock drift can be added to the expressions or to the idle time to account for drift of the controller timer.

Still another approach to reduce the power drain of the wireless communication device 500 is to enter the sleep mode based on the role of the NAN device in the cluster. For example, when the NAN device joins a NAN device cluster, it may be assigned a role of a non-master NAN device. The controller 515 of the device can change operation from a non-master NAN device sync mode to a non-master NAN device non-sync mode. If the NAN device enters a non-sync mode, it is not required by the NAN protocol to advertise services or discover other devices. When in the non-sync mode, the NAN device only needs to receive one synchronization beacon of a DW which may take less than 1 ms. After the beacon is received, the controller 515 can initiate the sleep mode. Thus, for a DW time duration of 16 ms, the power drain of the transceiver is reduced by a factor of 16.

For completeness, the conditions (C2 and C2) for a NAN device in a non-master role changing from sync to non-sync mode follow. In condition C1, the NAN device does not receive any Synchronization Beacon frames with the RSSI higher than RSSI_close from a NAN Device within the same NAN Cluster, and a. Anchor Master Rank field value of the Synchronization Beacon is equal to the NAN Device's recorded Anchor Master Rank, and
  i. Hop Count field value of the Synchronization Beacon transmitter is lower than the NAN Device's Hop Count field value, or
  ii. Hop Count field value is equal, and the Master Rank of the Synchronization Beacon transmitter is higher than the NAN Device's Master Rank In condition C2, the NAN device receives Synchronization Beacon frames from less than three NAN Devices within the same NAN Cluster with RSSI higher than RSSI_middle, and a. Anchor Master Rank field value of the Synchronization Beacon is equal to the NAN Device's recorded Anchor Master Rank, and
  i. Hop Count field value of the Synchronization Beacon transmitter is lower than the NAN Device's Hop Count field value, or
  ii. Hop Count field value is equal, and the Master Rank of the Synchronization Beacon transmitter is higher than the NAN Device's Master Rank The several example described reduce the power consumption of WiFi communication devices. Energy drain of the devices is reduced by reducing the amount of time that a device needs to have power provided to its transceiver or transceivers when certain conditions are met. These conditions relate to aspects of the communication protocol used by the WiFi devices such as the NAN protocol for example. Thus, the example devices, systems, and methods provide a communication protocol that does not consume a major portion of the energy used to power an electronic device.

ADDITIONAL NOTES AND EXAMPLES

Example 1 can include subject matter (such as a wireless communication device) comprising a transceiver configured to communicate information with one or more neighbor devices in accordance with a sync mode of a WiFi communication protocol; and a controller configured to monitor for reception of at least one of a response frame or a beacon frame sent by any neighbor device, determine whether to schedule transmission of a service frame, and change operation to a background scan mode when the at least one of the response frame or the beacon frame sent by any neighbor device is undetected for a specified time duration and the transmission of a service frame is unscheduled.

In Example 2, the subject matter of Example 1 can optionally include a transceiver configured to communicate the information in accordance with a NAN protocol, and wherein the controller is configured to join a cluster of NAN devices according to the NAN protocol, and transition communication to a non-sync mode that includes a sleep mode that disables the transceiver during at least one scheduled discovery window time duration of the cluster.

In Example 3, the subject matter of Example 2 can optionally include a controller configured to, when in the sleep mode, select a scheduled discovery window according to a random selection algorithm and enable the transceiver during the selected scheduled discovery window.

In Example 4, the subject matter of one or any combination of Examples 2 and 3 can optionally include a controller configured to, when in the sleep mode, select a plurality of scheduled discovery windows, enable the transceiver during the plurality of scheduled discovery windows, and transmit a number of service discovery frames that is different from a number of synchronization beacon frames transmitted during the selected plurality of scheduled discovery windows.

In Example 5, the subject matter of one or any combination of Examples 1-4 can optionally include a controller configured to join a device communication cluster according to a NAN protocol, determine whether the wireless device requires a service from a separate communication device, and change to a sleep mode that disables the transceiver before receiving a service discovery frame and before expiration of the scheduled discovery window when the service is not required.

In Example 6, the subject matter of Example 5 can include a controller configured to change to a sleep mode that disables the transceiver after a receiving service discovery frame and before expiration of the scheduled discovery window when the service is required.

In Example 7, the subject matter of one or any combination of Examples 1-6 can optionally include a controller configured to join a device communication cluster according to a NAN protocol as a non-master NAN device, change from a non-master NAN device sync mode to a non-master NAN device non-sync mode, and enter a sleep mode that disables the transceiver for a specified time duration when in the non-master NAN device non-sync mode.

In Example 8, the subject matter of one or any combination of Examples 1-7 can include a wireless communication device that is a cell phone.

In Example 9, the subject matter of one or any combination of Examples 1-7 can include a wireless communication device that is a WiFi communication station.

Example 10 can include subject matter, or can optionally be combined with the subject matter of one or any combination of Examples 1-9 to include such subject matter, such as a computer readable medium including instructions that when performed by a machine (e.g., a wireless communication device) cause the machine to operate according to a sync-mode of a WiFi communication protocol that includes transmission of a beacon frame to initiate at least one of joining a cluster of devices or starting a cluster, determine whether to schedule transmission of a service discovery frame, monitor for at least one of a response frame or a beacon frame sent by any neighbor device of the cluster, and change operation to a background scan mode when the at least one of the response frame or the beacon frame sent by any neighbor device is undetected for a specified time duration and transmission of a service frame by the computing device is unscheduled.

In Example 11, the subject matter of Example 10 can optionally include instructions to join a cluster according to a neighbor awareness networking (NAN) protocol and operate in a non-sync mode when joined to the cluster, wherein the non-sync mode includes a sleep mode that disables a transceiver of the computing device during at least one scheduled discovery window time duration of the cluster.

In Example 12, the subject matter of one or any combination of Examples 10 and 11 can optionally include instructions to, when in the non-sync mode, select a scheduled discovery window according to a random selection algorithm and enable the transceiver of the wireless communication device during the selected scheduled discovery window.

In Example 13, the subject matter of one or any combination of Examples 10-12 can optionally include instructions to, when in the non-sync mode, select a plurality of scheduled discovery windows; enable the transceiver of the WLAN device during the plurality of scheduled discovery windows; and transmit a number of synchronization beacon frames different from a number of service discovery frames during the selected plurality of scheduled discovery windows.

In Example 14, the subject matter of one or any combination of Examples 10-13 can optionally include instructions to join a cluster according to a NAN protocol, determine whether the wireless device requires a service from a separate communication device; and change to a sleep mode that disables the transceiver before receiving a service discovery frame and before expiration of the scheduled discovery window when the service is not required.

In Example 15, the subject matter of Example 14 can optionally include instructions to change to a sleep mode that disables the transceiver after receiving a service discovery frame and before expiration of the scheduled discovery window when the service is required.

In Example 16, the subject matter of one or any combination of Examples 10-15 can optionally include instructions to join a cluster according to a NAN protocol as a non-master NAN device in a sync mode, change from the non-master NAN device sync mode to a non-master NAN device non-sync mode, and enter a sleep mode that disables the transceiver during a specified number of scheduled discovery windows when the wireless communication device is in the non-master NAN device non-sync mode.

Example 17 can include subject matter (such as a wireless communication system), or can optionally be combined with the subject matter of one or any combination of Examples 1-16 to include such subject matter, comprising a transceiver configured to communicate information with one or more neighbor devices in accordance with a sync mode of a WiFi communication protocol, one or more antennas electrically coupled to the transceiver, and a controller configured to monitor for reception of at least one of a response frame or a beacon frame sent by any neighbor device, determine whether to schedule transmission of a service frame, and change operation to a background scan mode when the at least one of the response frame or the beacon frame sent by any neighbor device is undetected for a specified time duration and the transmission of a service frame is unscheduled.

In Example 18, the subject matter of Example 17 can optionally include a controller configured to initiate transmission of a synchronization frame during a scheduled discovery window when in the sync mode and, when in a non-sync mode, enter a sleep mode for a specified time duration that includes at least one discovery window interval, wherein the sleep mode includes disabling the transceiver.

In Example 19, the subject matter of Example 18 can optionally include a controller configured to enter the sleep mode for M consecutive discovery windows and leave the sleep mode and enable the transceiver for W consecutive discovery windows, wherein M and W are positive integers and at least one of M and W is greater than one.

In Example 20, the subject matter of one or any combination of Examples 18-19 can optionally include a controller configured to schedule a discovery window once during a discovery window interval, and transmit a service discovery frame during a discovery window after expiration of an advertising interval, wherein the advertising interval includes N discovery window intervals and N is a positive integer greater than one, and wherein the controller is further configured to initiate the sleep mode outside of the discovery window during which the service discovery frame is transmitted.

In Example 21, the subject matter of one or any combination of Examples 18-20 can optionally include a controller configured to, when in the non-sync mode, select a scheduled discovery window according to a random selection algorithm and enable the transceiver during the selected scheduled discovery window In Example 22, the subject matter of one or any combination of Examples 18-21 can optionally include a controller configured to, when in the sleep mode, select a plurality of scheduled discovery windows, enable the transceiver during the plurality of scheduled discovery windows, and transmit a number of service discovery frames that is different from a number of synchronization beacon frames transmitted during the selected plurality of scheduled discovery windows.

In Example 23, the subject matter of one or any combination of Examples 17-22 can optionally include a controller configured to join a device communication cluster according to a NAN protocol, determine whether the wireless device requires a service from a separate communication device, and change to a sleep mode that disables the transceiver before receiving a service discovery frame and before expiration of the scheduled discovery window when the service is not required.

In Example 24, the subject matter of Example 23 can optionally include a controller configured to change to a sleep mode that disables the transceiver after a receiving service discovery frame and before expiration of the scheduled discovery window when the service is required.

In Example 25, the subject matter of one or any combination of Examples 17-24 can optionally include a controller configured to join a device communication cluster according to a NAN protocol as a non-master NAN device, change from a non-master NAN device sync mode to a non-master NAN device non-sync mode, and enter a sleep mode that disables the transceiver for a specified time duration when in the non-master NAN device non-sync mode.

Example 26, can include subject matter (such as a method, a means for performing acts, or a machine-readable medium including instructions that, when performed by the machine, cause the machine to perform acts), or can optionally be combined with the subject matter of one or any combination of Examples 1-25 to include such subject matter, comprising operating the WLAN device in a sync-mode that includes transmitting a beacon frame to initiate at least one of joining a cluster of devices or starting a cluster of devices, monitoring for at least one of a response frame or a beacon frame sent by any neighbor device of the device cluster, and changing operation to a background scan mode when the at least one of the response frame or the beacon frame is undetected by the WLAN device for a specified time duration and transmission of a service discovery frame by the WLAN device is unscheduled.

In Example 27, the subject matter of Example 26 can include operating the WLAN device to join a device cluster according to NAN protocol, and operating the WLAN device in a non-sync mode when joined to the device cluster including operating the WLAN device in a sleep mode that disables a transceiver of the WLAN device during at least one discovery window scheduled for the device cluster.

In Example 28, the subject matter of Example 27 can optionally include selecting, when in the sleep mode, a scheduled discovery window according to a random selection algorithm and enable the transceiver during the selected scheduled discovery window.

In Example 29, the subject matter of one or any combination of Examples 26-28 can optionally include selecting a plurality of scheduled discovery windows when in the non-sync mode, enabling the transceiver of the WLAN device during the plurality of scheduled discovery windows, transmitting a number of synchronization beacon frames different from a number of service discovery frames during the selected plurality of scheduled discovery windows, and disabling the transceiver during unselected discovery windows.

In Example 30, the subject matter of one or any combination of Examples 26-29 can optionally include operating the WLAN device to join a device communication cluster according to a NAN protocol, determining whether the WLAN device requires a service from a separate communication device when joined to the cluster, changing operation of the WLAN device to a sleep mode that disables the transceiver before receiving a service discovery frame and before expiration of a discovery window scheduled for the cluster when the service is not required, and changing operation of the WLAN device to the sleep mode after receiving a service discovery frame and before expiration of the scheduled discovery window when the service is required.

In Example 31, the subject matter of one or any combination of Examples 26-31 can optionally include joining a device communication cluster according to a NAN protocol as a non-master NAN device, changing from a non-master NAN device sync mode to a non-master NAN device non-sync mode, and entering a sleep mode that disables the transceiver for a specified time duration when in the non-master NAN device non-sync mode.

These non-limiting examples can be combined in any permutation or combination.

The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Method examples described herein can be machine or computer-implemented at least in part. Some examples can include a computer-readable storage medium or machine-readable storage medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. The code can be tangibly stored on one or more volatile, non-transitory, or non-volatile tangible computer-readable media, such as during execution or at other times. Examples of these tangible computer-readable storage media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment. Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

What is claimed is:

1. A wireless communication device comprising:
a transceiver configured to communicate information with one or more neighbor devices in accordance with a sync mode of a WiFi communication protocol; and
a controller configured to:
monitor for reception of at least one of a response frame or a beacon frame sent by any neighbor device;
determine whether to schedule transmission of a service frame;
join a cluster of devices according to a network protocol and transition communication to a non-sync mode that includes a sleep mode that recurrently disables the transceiver during scheduled discovery window time durations of the cluster; and
change operation to a background scan mode when the at least one of the response frame or the beacon frame sent by any neighbor device is undetected for a specified time duration and the transmission of a service frame is unscheduled.

2. The wireless communication device of claim 1, wherein the transceiver is configured to communicate the information in accordance with a neighbor awareness networking (NAN) protocol, and wherein the controller is configured to join a cluster of NAN devices according to the NAN protocol.

3. The wireless communication device of claim 2, wherein the controller is configured to, when in the sleep mode, select a scheduled discovery window according to a random selection algorithm and enable the transceiver during the selected scheduled discovery window.

4. The wireless communication device of claim 2, wherein the controller is configured to, when in the sleep mode, select a plurality of scheduled discovery windows, enable the transceiver during the plurality of scheduled discovery windows, and transmit a number of service discovery frames that is different from a number of synchronization beacon frames transmitted during the selected plurality of scheduled discovery windows.

5. The wireless communication device of claim 1, wherein the controller is configured to:
join a device communication cluster according to a neighbor awareness networking (NAN) protocol;
determine whether the wireless device requires a service from a separate communication device; and
change to a sleep mode that disables the transceiver before receiving a service discovery frame and before expiration of the scheduled discovery window when the service is not required.

6. The wireless communication device of claim 5, wherein the controller is configured to change to a sleep mode that disables the transceiver after a receiving service discovery frame and before expiration of the scheduled discovery window when the service is required.

7. The wireless communication device of claim 1, wherein the controller is configured to:
join a device communication cluster according to a neighbor awareness networking (NAN) protocol as a non-master NAN device;
change from a non-master NAN device sync mode to a non-master NAN device non-sync mode; and
enter a sleep mode that disables the transceiver for a specified time duration when in the non-master NAN device non-sync mode.

8. The wireless communication device of claim 1, wherein the device is a smart phone.

9. The wireless communication device of claim 1, wherein the device is a WiFi communication station.

10. A non-transitory computer readable storage medium including instructions that when executed by hardware processing circuitry of a wireless communication device cause the wireless communication device to:
operate according to a sync-mode of a WiFi communication protocol that includes transmission of a beacon frame to initiate at least one of joining a cluster of devices or starting a cluster;
transition communication to a non-sync mode that includes a sleep mode that recurrently disables the transceiver during scheduled discovery window time durations of the cluster;
determine whether to schedule transmission of a service discovery frame;
monitor for at least one of a response frame or a beacon frame sent by any neighbor device of the cluster; and change operation to a background scan mode when the at least one of the response frame or the beacon frame sent by any neighbor device is undetected for a specified time duration and transmission of a service frame by the computing device is unscheduled.

11. The computer readable storage medium of claim 10, including instructions that when executed by the wireless communication device cause the wireless communication device to join a cluster according to a neighbor awareness networking (NAN) protocol.

12. The computer readable storage medium of claim 11, including instructions that when executed by the wireless communication device cause the wireless communication device to, when in the non-sync mode, select a scheduled discovery window according to a random selection algorithm and enable the transceiver of the wireless communication device during the selected scheduled discovery window.

13. The computer readable storage medium of claim 11, including instructions that when executed by the wireless communication device cause the wireless communication device to, when in the non-sync mode, select a plurality of scheduled discovery windows; enable the transceiver of the WLAN device during the plurality of scheduled discovery windows; and transmit a number of synchronization beacon frames different from a number of service discovery frames during the selected plurality of scheduled discovery windows.

14. The computer readable storage medium of claim 10, including instructions that when executed by the wireless communication device cause the wireless communication device to join a cluster according to a neighbor awareness networking (NAN) protocol, determine whether the wireless device requires a service from a separate communication device; and change to a sleep mode that disables the transceiver before receiving a service discovery frame and before expiration of the scheduled discovery window when the service is not required.

15. The computer readable storage medium of claim 14, including instructions that when executed by the wireless communication device cause the wireless communication device to change to a sleep mode that disables the transceiver after receiving a service discovery frame and before expiration of the scheduled discovery window when the service is required.

16. The computer readable storage medium of claim 10, including instructions that when executed by the wireless communication device cause the wireless communication device to:
join a cluster according to a neighbor awareness networking (NAN) protocol as a non-master NAN device in a sync mode;
change from the non-master NAN device sync mode to a non-master NAN device non-sync mode; and
enter a sleep mode that disables the transceiver during a specified number of scheduled discovery windows when the wireless communication device is in the non-master NAN device non-sync mode.

17. A wireless communication system comprising:
a transceiver configured to communicate information with one or more neighbor devices in accordance with a sync mode of a WiFi communication protocol;
one or more antennas electrically coupled to the transceiver; and
a controller configured to:
monitor for reception of at least one of a response frame or a beacon frame sent by any neighbor device;
determine whether to schedule transmission of a service frame;
join a cluster of devices according to a network protocol and transition communication to a non-sync mode that includes a sleep mode that recurrently disables the transceiver during scheduled discovery window time durations of the cluster; and
change operation to a background scan mode when the at least one of the response frame or the beacon frame sent by any neighbor device is undetected for a specified time duration and the transmission of a service frame is unscheduled.

18. The wireless communication system of claim 17, wherein the controller is configured to initiate transmission of a synchronization frame during a scheduled discovery window when in the sync mode and, when in a non-sync mode, enter a sleep mode for a specified time duration that includes at least one discovery window interval, wherein the sleep mode includes disabling the transceiver.

19. The wireless communication system of claim 18, wherein the controller is configured to enter the sleep mode for M consecutive discovery windows and leave the sleep mode and enable the transceiver for W consecutive discovery windows, wherein M and W are positive integers and at least one of M and W is greater than one.

20. The wireless communication system of claim 18, wherein the controller is configured to schedule a discovery window once during a discovery window interval, and transmit a service discovery frame during a discovery window after expiration of an advertising interval, wherein the advertising interval includes N discovery window intervals and N is a positive integer greater than one, and wherein the controller is further configured to initiate the sleep mode outside of the discovery window during which the service discovery frame is transmitted.

21. The wireless communication system of claim 18, wherein the controller is configured to, when in the non-sync mode, select a scheduled discovery window according to a random selection algorithm and enable the transceiver during the selected scheduled discovery window.

22. A method of operating a wireless local area network (WLAN) device, the method comprising:
operating the WLAN device in a sync-mode that includes transmitting a beacon frame to initiate at least one of joining a cluster of devices or starting a cluster of devices;
monitoring for at least one of a response frame or a beacon frame sent by any neighbor device of the device cluster;
operating the WLAN device in a non-sync mode when joined to the device cluster including operating the WLAN device in a sleep mode that recurrently disables a transceiver of the WLAN device during discovery windows scheduled for the device cluster; and
changing operation to a background scan mode when the at least one of the response frame or the beacon frame is undetected by the WLAN device for a specified time duration and transmission of a service discovery frame by the WLAN device is unscheduled.

23. The method of claim 22, including:
operating the WLAN device to join a device cluster according to a neighbor awareness networking (NAN) protocol.

24. The method of claim 22, including:
selecting a plurality of scheduled discovery windows when in the non-sync mode; enabling the transceiver of the WLAN device during the plurality of scheduled discovery windows; transmitting a number of synchronization beacon frames different from a number of service discovery frames during the selected plurality of scheduled discovery windows; and disabling the transceiver during unselected discovery windows.

25. The method of claim 22, including:
operating the WLAN device to join a device communication cluster according to a neighbor awareness networking (NAN) protocol;
determining whether the WLAN device requires a service from a separate communication device when joined to the cluster;
changing operation of the WLAN device to a sleep mode that disables the transceiver before receiving a service discovery frame and before expiration of a discovery window scheduled for the cluster when the service is not required; and
changing operation of the WLAN device to the sleep mode after receiving a service discovery frame and before expiration of the scheduled discovery window when the service is required.

* * * * *